(12) United States Patent
Bifano et al.

(10) Patent No.: US 6,529,311 B1
(45) Date of Patent: Mar. 4, 2003

(54) MEMS-BASED SPATIAL-LIGHT MODULATOR WITH INTEGRATED ELECTRONICS

(75) Inventors: Thomas Bifano, Mansfield, MA (US); Mark Horenstein, West Roxbury, MA (US)

(73) Assignee: The Trustees of Boston University, Boston, MA (US)

( * ) Notice: Subject to any disclaimer, the term of this patent is extended or adjusted under 35 U.S.C. 154(b) by 0 days.

(21) Appl. No.: 09/702,054

(22) Filed: Oct. 30, 2000

Related U.S. Application Data

(60) Provisional application No. 60/161,939, filed on Oct. 28, 1999.

(51) Int. Cl.[7] .............................................. G02B 26/00
(52) U.S. Cl. ..................... 359/291; 359/290; 359/223; 359/224; 359/298
(58) Field of Search ................................ 359/290, 291, 359/223, 224, 298, 248, 900

(56) References Cited

U.S. PATENT DOCUMENTS

| | | | |
|---|---|---|---|
| 4,954,789 A | * 9/1990 | Sampsell | 330/4.3 |
| 5,312,513 A | * 5/1994 | Florence et al. | 156/643 |
| 5,535,047 A | * 7/1996 | Hornbeck | 359/295 |
| 5,867,302 A | 2/1999 | Fleming | 359/291 |
| 6,028,689 A | 2/2000 | Michalicek et al. | 359/224 |
| 6,123,985 A | 9/2000 | Robinson et al. | 428/162 |
| 6,181,460 B1 | 1/2001 | Tran et al. | 359/291 |
| 6,329,738 B1 | * 12/2001 | Hung et al. | 310/309 |
| 6,396,619 B1 | 5/2002 | Huibers et al. | 359/291 |

* cited by examiner

*Primary Examiner*—Hung Xuan Dang
*Assistant Examiner*—Tuyen Tra
(74) *Attorney, Agent, or Firm*—Weingarten, Schurgin, Gagnebin & Lebovici LLP

(57) ABSTRACT

Method and apparatus for forming an array of reflective elements for spatial light modulation. The array includes a substrate supporting electronically addressable actuators, each associated with a corresponding reflective element, a coupling attaching each actuator to the corresponding reflective element to place each reflective element in a substantially planar surface. Each electronically addressable actuator responds to predetermined addressing from a processing circuit to reposition the corresponding reflective element out of the planar surface a predetermined distance identified in the predetermined electronic addressing.

9 Claims, 7 Drawing Sheets

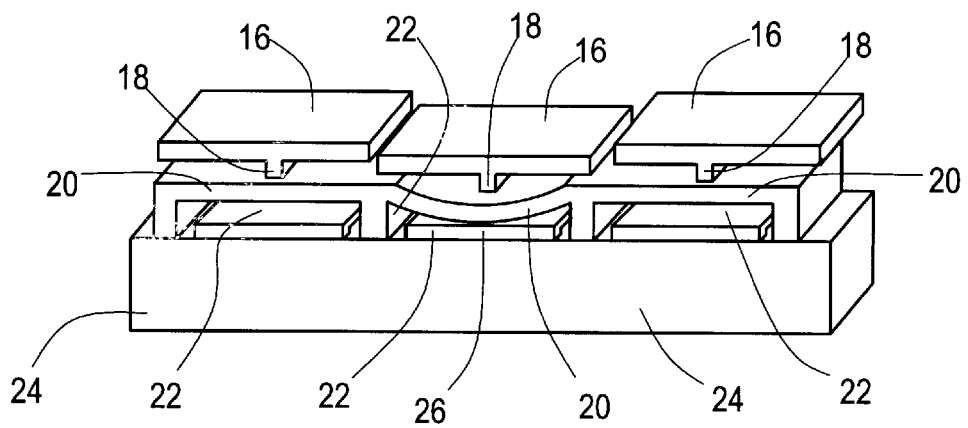
*FIG. 3*
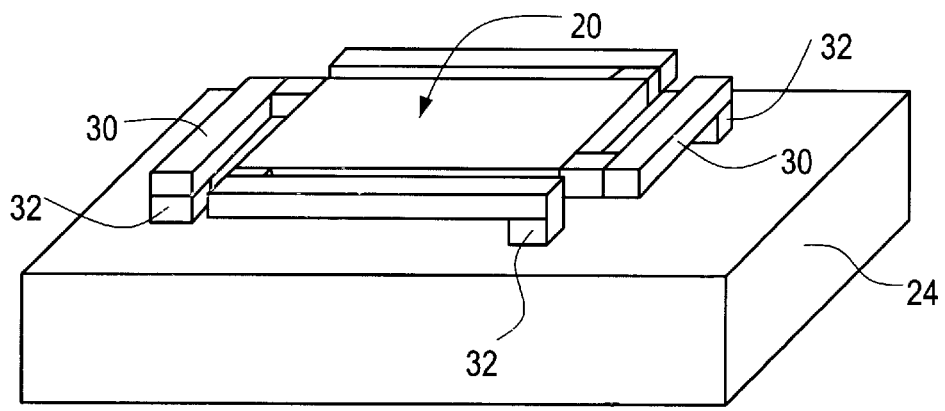
*FIG. 4*
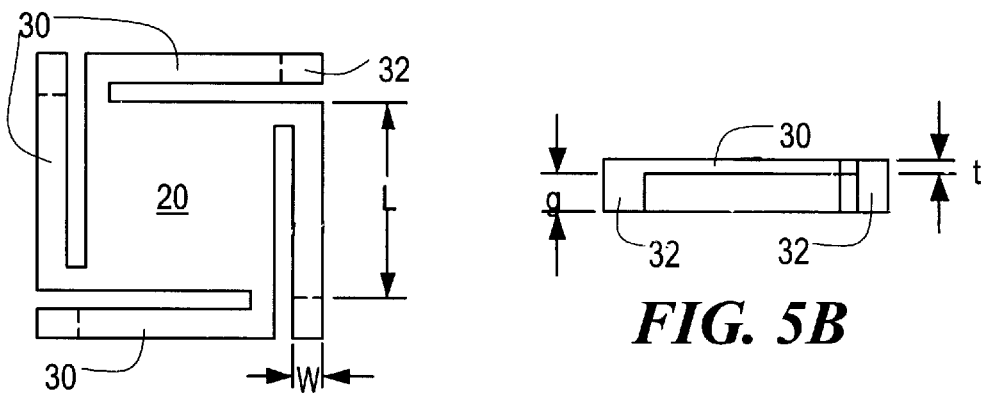
*FIG. 5A*
*FIG. 5B*

Deposit polymer

Pattern polymer for
structural anchors

Deposit metal

Pattern and etch metal

Sacrificial release

Deposit and pattern 2nd polymer

Deposit 2nd metal

Pattern and etch metal, release

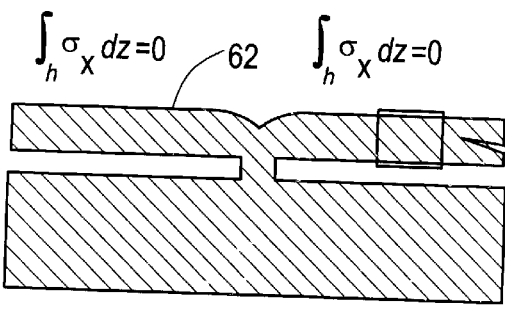
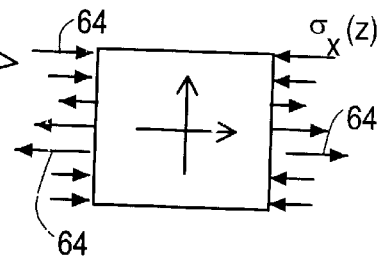
FIG. 15  FIG. 16
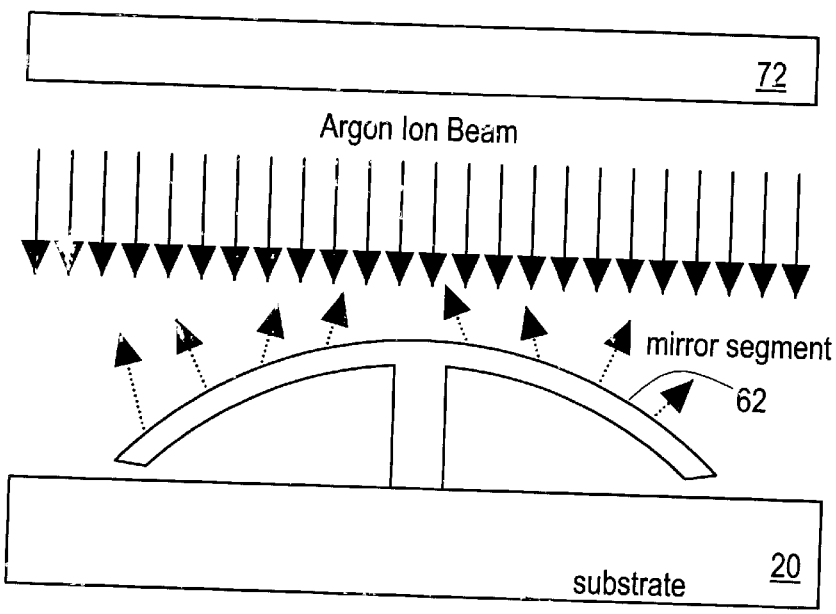
FIG. 17
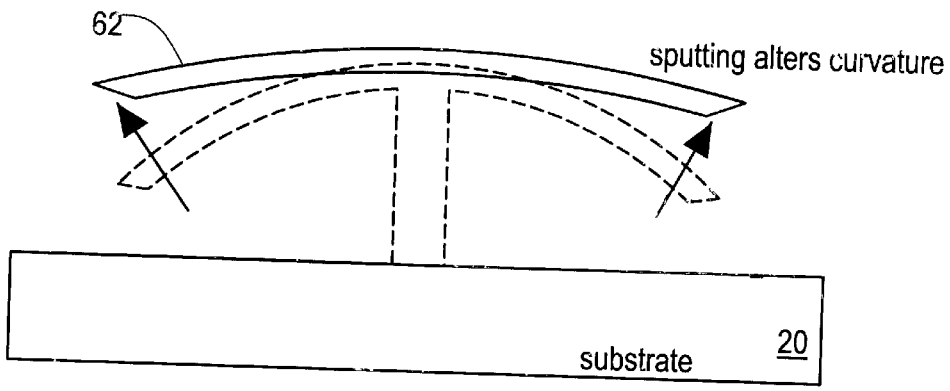
FIG. 18

MEMS-BASED SPATIAL-LIGHT MODULATOR WITH INTEGRATED ELECTRONICS

CROSS REFERENCE TO RELATED APPLICATIONS

This application claims priority from U.S. Provisional Application No. 60/161,939, filed Oct. 28, 1999, which is incorporated herein by reference.

STATEMENT REGARDING FEDERALLY SPONSORED RESEARCH OR DEVELOPMENT

This invention was made with U.S. Government Support under Contract Number F08630-00-C-006, awarded by the Air Force Office of Scientific Research. The Federal Government therefore has certain rights in the invention.

FIELD AND BACKGROUND OF THE INVENTION

Spatial light modulation is used in the fields of optical information processing, projection displays, video and graphics monitors, televisions, and electrophotographic printing. There optical beams are deflected by mirror arrays where it is desired to be able to individually phase adjust the reflected light from each mirror. Because of the large number of mirrors in such arrays it is important to be able to achieve high speeds in the addressing of each mirror as well as accurate control of each mirror's displacement.

SUMMARY OF THE INVENTION

The present invention utilizes a mirror array for use in spatial light modulation. A CMOS circuit is provided on a substrate in an array corresponding to the placement desired for each mirror. A low temperature procedure making use of wet soluble polymer photoresists, sputter deposition and ion etching is then utilized to create a structure above the CMOS circuit comprising a metalized or metal diaphragm supported by flexures from the substrate. The diaphragm and circuit each include opposite plates of a capacitor. The application of a voltage between the circuit and the diaphragm causes the diaphragm to be attracted or repelled by electrostatic forces. In the micron and submicron size of the mirror assemblies and arrays, voltages of a few volts compatible with CMOS circuitry is able to create a half micron displacement.

The fabrication process then uses the same low temperature procedures to create a mirror on top of the diaphragm and supported from it by a single support post. Once released from any polymer used in the fabrication process, the mirror has bending stresses released by a sputter removal of surface layers until a planar surface is achieved. Prior to release, mirror surface roughness can be removed by polishing.

DESCRIPTION OF THE DRAWING

These and other features of the present invention are more fully set forth in the detailed description below and in the accompanying drawing of which:

FIG. 3 is a sectional view of three elements of an array according to the invention;

FIG. 4 is a perspective view of a diaphragm according to the invention;

FIGS. 5A and 5B are diagrammatic top and side views of a diaphragm according to the invention;

FIGS. 15–16 illustrate the presence of stress in a mirror element according to the invention;

FIGS. 17–19 illustrate steps in relieving stress in mirror elements according to the invention;

DETAILED DESCRIPTION

The present invention provides a driven array of mircomechanically produced mirrors useful in spatial light modulation (SLMs) to form an optical image. SLMs have application in optical information processing, projection displays, video and graphics monitors, televisions, and electrophotographic printing.

Figure 1:
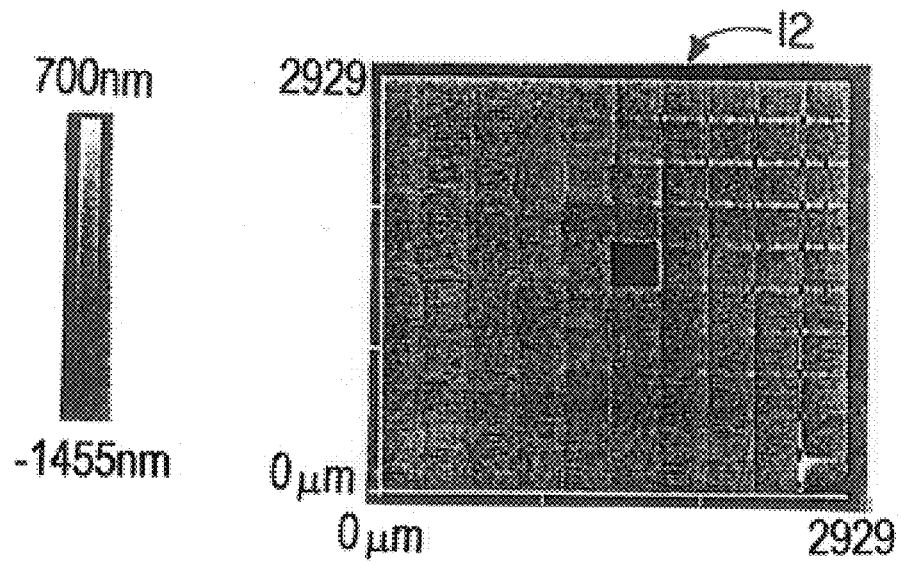
FIG. 1 is a view of an interferometric microscopic photograph of an array according to the invention.
Figure 2:
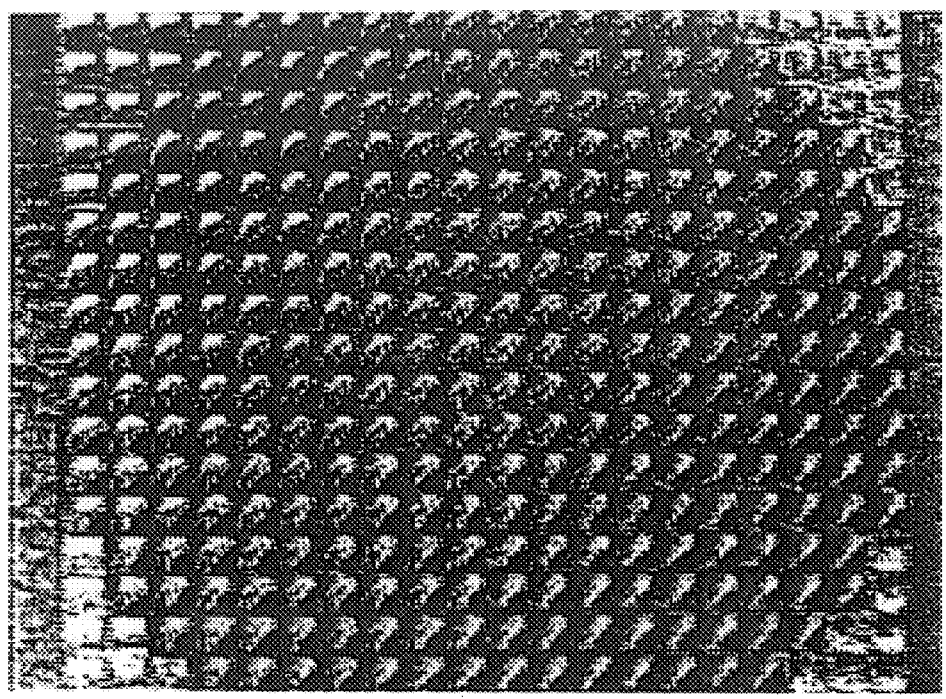
FIG. 2 is an optical microscope view of another array according to the invention.

The invention provides a new type of SLM useful in phase-only optical correlators. An array of mirrors is provided that can be moved over a full wavelength allowing 360 degrees of phase control. Interferometric and optical microscopic images of such an array 12 are illustrated in FIG. 1 and 2. A single 300 micron square mirror 14 is shown raised 2 microns. An expanded view of three mirror assemblies of an array according to the invention is shown in FIG. 3. There three mirrors 16 are provided, typically as metalizations deposited from a sputter or other low temperature deposition, along with struts 18 supporting the mirror from a diaphragm or platform 20. The diaphragms 20 are themselves the product of a metalization deposition similar to that for the mirrors 16. They are produced leaving a cavity 22 under and between them and a substrate 24. Beneath the diaphragms 20 CMOS circuits 26 are provided to generate an electrostatic force that attracts the diaphragms 20 and in turn the mirrors 16 an amount corresponding to input signals to the CMOS circuits as described below. The processing of the diaphragms 20 and mirrors 16 using low temperature processing such as polymer photoresists and sputter depositions are more fully described below.

The structure of the diaphragms 20 is more fully shown in the perspective view of FIG. 4 and diagrammatic views of FIGS. 5A and B. As shown there, the diaphragms 20 have peripheral flexures 30 leading from diametrically opposite corners to support posts 32, all produced in a sputter deposition as described below.

Figure 6:
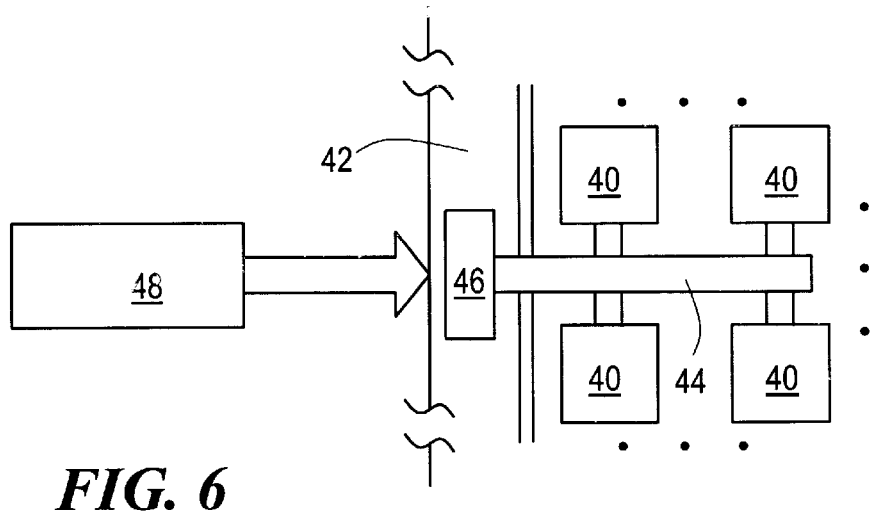
FIG. 6–FIGS. 14A, B are top and side sectional views illustrating processing steps in the fabrication of an array according to the invention.

The process of formation of the mirror array begins, as shown in FIG. 6, with the formation by micromechanical, LSI type processing, on a typically silicon substrate 42, of a set of typically CMOS circuits 40, one for each mirror element to be generated. The circuits 40, as more fully described below, are fed by a data bus 44 from on chip circuitry 46 responsive in turn to signals from a CPU 48 or other off chip processor.

Figure 7A:
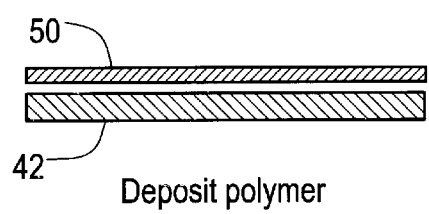
Figure 7B:
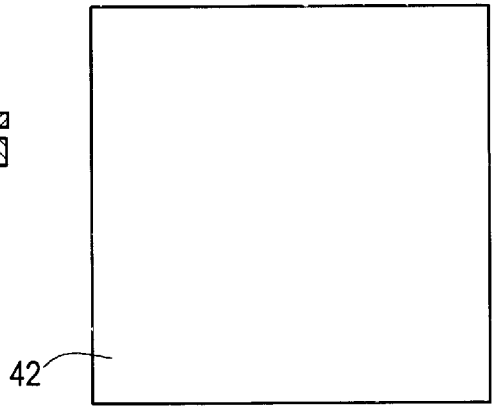
Figure 8A:
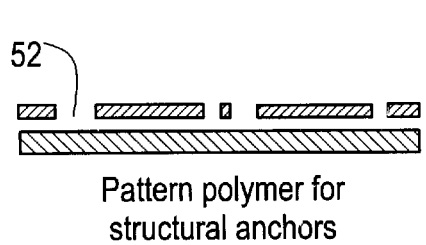
Figure 8B:
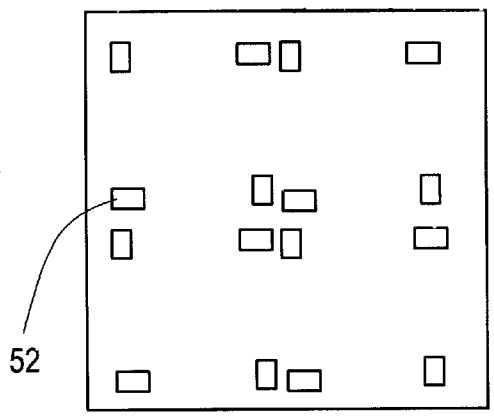
Figure 9A:
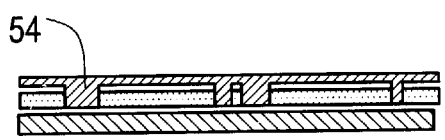
Figure 9B:
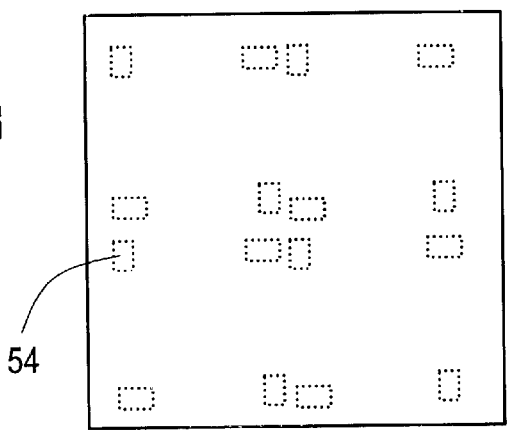

Because the CMOS circuits 40 are fabricated first, the remaining structural processing is a low temperature procedure that prevents thermal damage to the circuits 40. That processing is initiated as shown in FIGS. 7A and B by depositing, such as by spin drying, a polymer photoresist layer 50 over the substrate 42. The polymer is chosen to be releasable after processing at low temperatures such as by wet etching in a solvent, or possible reactive ion etching in an oxygen plasma. The polymer photoresist layer 50 is exposed and developed to leave apertures 52 in FIGS. 8A and B for the deposition of a metalization or metal layer 54 for the anchors and for the diaphragm and its flexures described above. The metal deposition 54 as shown in FIGS. 9A and B can be sputtered material such as a chromium-aluminum composite, aluminum, gold, or nickel.

Figure 10A:
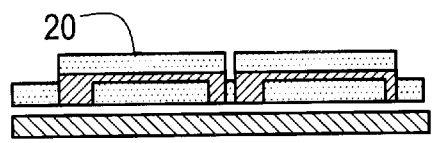
Figure 10B:
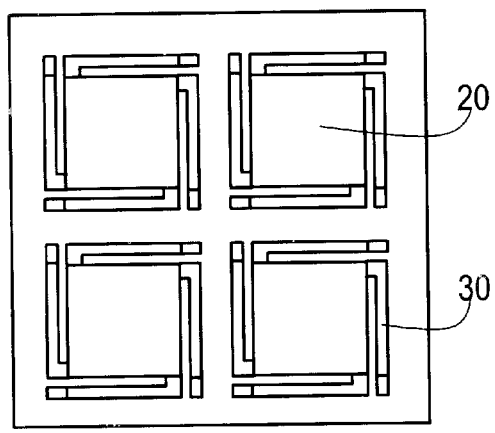

The metal layer is patterned and etched in FIGS. 10A and B to leave the flexure 30 supported diaphragm 20. A polymer photoresist and reactive ion etch, such as in a chlorine atmosphere, may be used to create and separate the flexures 30 and diaphragm 20.

Figure 11A:
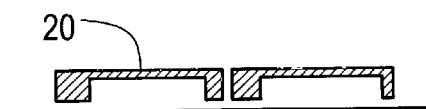
Figure 11B:
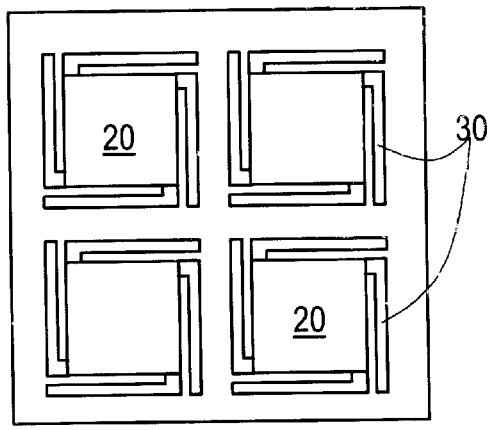
Figure 12A:
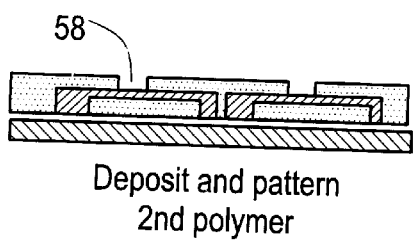
Figure 12B:
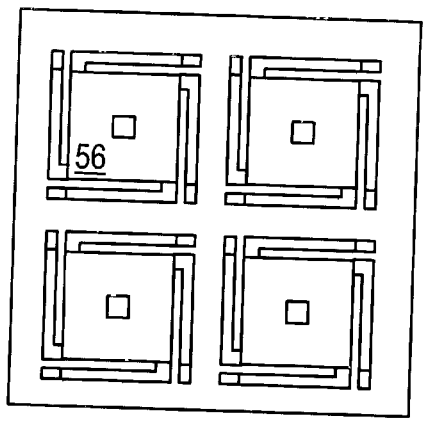
Figure 13A:
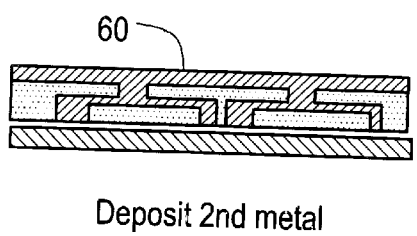
Figure 13B:
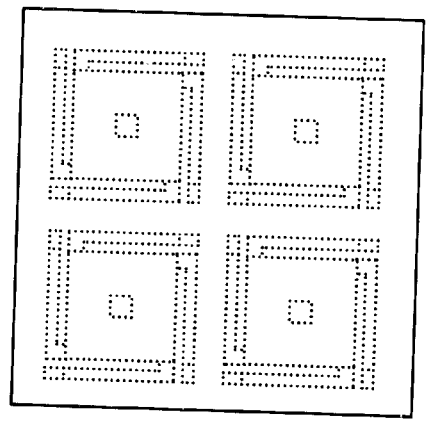
Figure 14A:
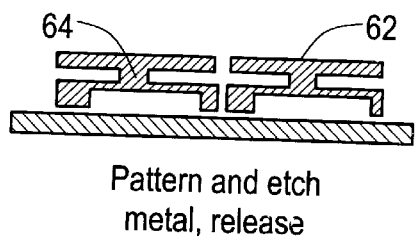
Figure 14B:
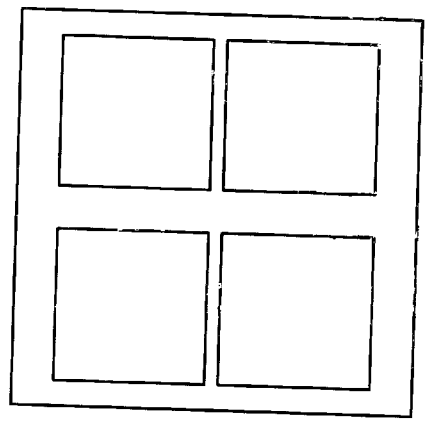

At this point, the photoresist may be released by wet solvent procedures as shown in FIGS. 11A and B or the mirror structure may be begun as shown in FIGS. 12A and B using a second layer of polymer resist 56. The resist is patterned to leave upon being developed an aperture 58 for the formation in the steps of FIGS. 13A and B of a metalized or metal layer 60 for the mirror. The procedures are similar to those in forming the metal layer 54 for the diaphragms 20. The metal layer 60 is patterned and etched as before in FIGS. 14A and B to separate the mirror structures 62 and their struts or posts 64. Finally the whole structure is subjected to a wet solvent procedure to remove all polymer. At some point in the procedure, such as at FIGS. 13A and B, before polymer release, the device may be given a surface polishing to remove surface roughness and improve the quality of reflection.

Figure 19:
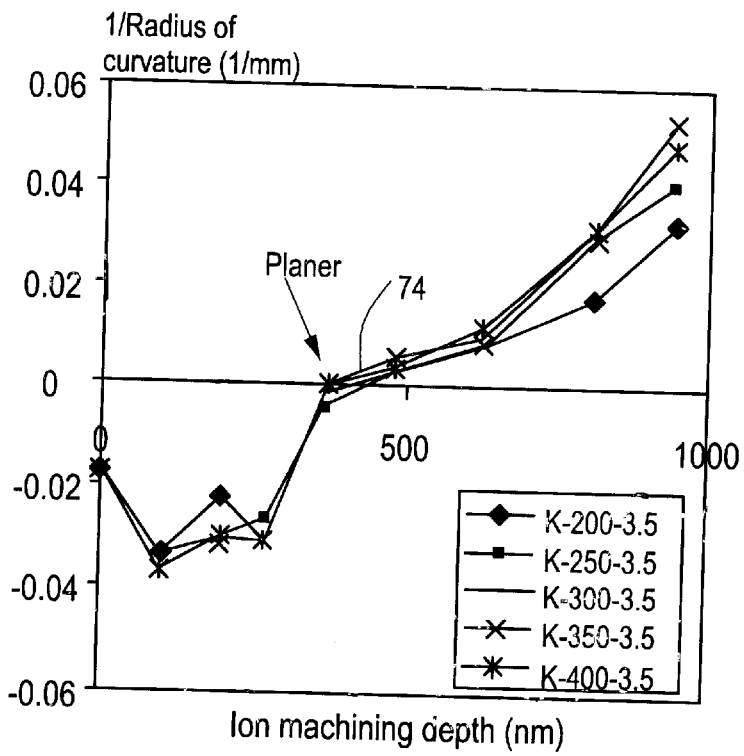

In some cases and in reference to FIGS. 16–19, the mirror 62 will exhibit a stress induced curvature resulting from the stresses built into the metal layer 60 during formation and release of supporting polymer at the conclusion of fabrication. These stresses 64, as shown in FIG. 16, vary over the depth of the mirror 62, and in fact change polarity. Thus, the stresses can be balanced giving a planar mirror surface by removal of portions of the mirror element 62 until a point is reached where the stresses combine to keep the mirror surface flat. This point can be reached in the process of removal of surface layers as shown in FIG. 19. The procedure for removal may utilize an ion beam 70 in an argon atmosphere to cut back the mirror surface. The process can be monitored by an interferometer 72 to detect the point of maximum flatness.

Figure 20:
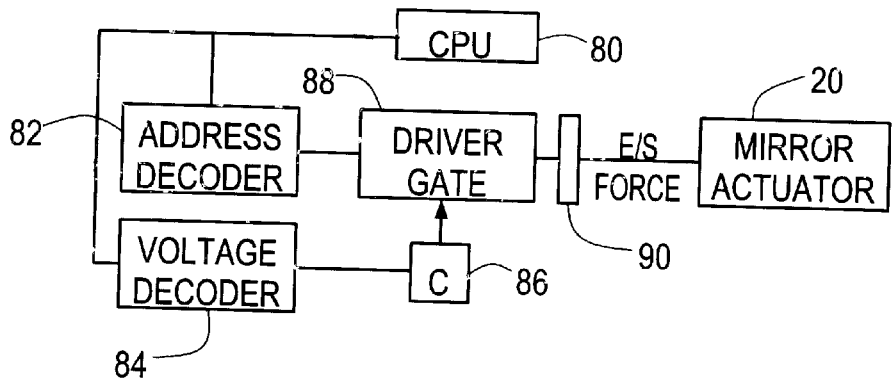
FIGS. 20–21 illustrate first and second embodiments for electronically driving mirrors according to the invention.
Figure 21:
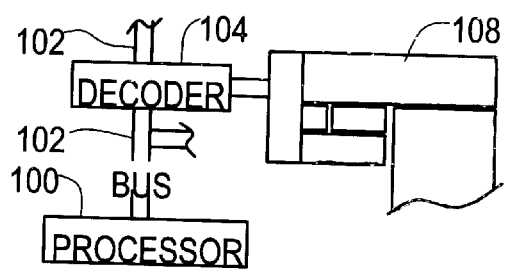

The circuitry 26 shown in FIG. 3 can be of several forms as illustrated in FIGS. 20 and 21. In FIG. 20 a CPU 80, off chip, applies instructions including addressing information designating, in a repeating sequence over the whole array 12, each of mirrors 16 to be moved and data typically in the form of a voltage indicating the amount and polarity of displacement of that mirror. This information is fed to the circuit 26 at each mirror assembly to an address decoder 82 and voltage decoder 84 where the voltage is stored in a capacitive memory 86. A driver gate 88 is activated when the corresponding mirror is addressed to apply that voltage through it to a capacitive plate 90 which in turn applies an electrostatic force to the actuator diaphragm 20. Sufficient motion can be achieved with a low voltage of, for example a few volts compatible with CMOS circuitry, to achieve the 360 degree change in light phase on the mirrors.

An alternative CMOS circuit is illustrated in FIG. 21 where an on or off chip processor 100 applies via a data bus 102 to respective decoders 104 addressing and displacement information. In a typical application of eight bit data, a 256×256 mirror array can be addressed and a data byte of eight bits used to achieve a resolution of 256 displacement positions. In this example, the decoder determines from the addressing when its corresponding mirror is being addressed and then uses each of the eight bits to apply a low voltage to corresponding capacitive plates in an array 108. The plates are sequentially sized, typically each plate being twice the size of its neighbor. Each data bit applies or does not apply a fixed voltage to the corresponding plate based on the bit being of one state or the other, achieving a combined force proportional to the area of activated plates and a resolution of 256 positions.

The invention can be broadly scaled to different size arrays and mirror areas. A total mirror displacement of half a micron can be provided to achieve the desired phase change in the optical spectrum. The spacing of the diaphragms 20 and CMOS circuits 26 is a function of the voltage available and the total desired displacement, response time and other factors within the grasp of those skilled in the art.

The invention is not intended to be limited by any of the above description and is to be interpreted on the scope of the following claims.

What is claimed is:

1. A method for fabrication of an array of individually positioned reflectors for spatial light modulation comprising the steps of:

providing plural addressable circuits in an array on a substrate;

forming a flexure supported platform associated with each said circuit, said platform being flexure supported from said substrate; and attaching a reflecting element to said platform on a side opposite from said substrate thereby providing a plurality of reflecting elements of said array aligned in a surface;

said circuit having electronics operative in response to a signal addressed thereto and operative in association with said platform to apply a force to move said platform and said reflecting element together to a predetermined position out of alignment with the array surface;

wherein said circuits providing step includes the step of providing a conductive plate on said substrate facing said platform, an addressable gate and a voltage memory, said gate operative to apply a voltage in said memory to said plate in response to said signal;

said signal having a voltage component corresponding to the predetermined position to which said reflective element is to be moved and an address component for activating said gate of an appropriately addressed circuit.

2. A method for fabrication of an array of individually positioned reflectors for spatial light modulation comprising the steps of:

providing plural addressable circuits in an array on a substrate;

forming a flexure supported platform associated with each said circuit, said platform being flexure supported from said substrate; and attaching a reflecting element to said platform on a side opposite from said substrate thereby providing a plurality of reflecting elements of said array aligned in a surface;

said circuit having electronics operative in response to a signal addressed thereto and operative in association with said platform to apply a force to move said platform and said reflecting element together to a predetermined position out of alignment with the array surface;

wherein said circuits providing step includes the step of providing a conductive plate on said substrate patterned as isolated plate electrodes of differing sizes and of providing an address and magnitude decoder responsive to said signal to energize a number of said electrodes corresponding to a decoded magnitude.

3. A method for fabrication of an array of individually positioned reflectors for spatial light modulation comprising the steps of:

providing plural addressable circuits in an array on a substrate;

forming a flexure supported platform associated with each said circuit, said platform being flexure supported from said substrate; and attaching a reflecting element to said platform on a side opposite from said substrate thereby providing a plurality of reflecting elements of said array aligned in a surface;

said circuit having electronics operative in response to a signal addressed thereto and operative in association with said platform to apply a force to move said platform and said reflecting element together to a predetermined position out of alignment with the array surface;

wherein said forming step includes the steps of:

depositing platform anchors and a metal layer on said substrate using a low temperature process comprising applying and patterning a polymer photoresist; and forming said platforms using a low temperature process comprising applying and patterning a polymer photoresist and etching said metal layer;

wherein the step of etching a metal layer includes the step of forming flexures in said metal layer connecting said platform to said anchors.

4. A method for fabrication of an array of individually positioned reflectors for spatial light modulation comprising the steps of:

providing plural addressable circuits in an array on a substrate;

forming a flexure supported platform associated with each said circuit, said platform being flexure supported from said substrate; and attaching a reflecting element to said platform on a side opposite from said substrate thereby providing a plurality of reflecting elements of said array aligned in a surface;

said circuit having electronics operative in response to a signal addressed thereto and operative in association with said platform to apply a force to move said platform and said reflecting element together to a predetermined position out of alignment with the array surface;

wherein said step of attaching a reflecting element includes the steps of:

depositing a metalized layer and strut supporting said metalized layer from said platform using a low temperature process comprising applying and patterning a polymer photoresist and applying and etching a metalized layer.

5. The method of claim 4 further including the step of wet etch releasing any remaining polymer.

6. The method of claim 4 further including the step of planarizing said metalized layer.

7. The method of claim 6 wherein said planarizing step includes one or both of polishing said metalized layer and eroding an outer surface of said metalized layer.

8. The method of claim 6 wherein said planarizing step includes the step of balancing stress vectors within said metalized layer formed during said attaching step.

9. The method of claim 6 wherein said planarizing step includes the step of reactive ion etching of said metalized layer to balance stress vectors within said metalized layer.

* * * * *